United States Patent
Jo

(10) Patent No.: US 8,040,279 B2
(45) Date of Patent: Oct. 18, 2011

(54) MEASURING POSITIONS

(75) Inventor: Yung-Hoon Jo, Gyeonggi-do (KR)

(73) Assignee: Core Logic, Inc., Seoul (KR)

( * ) Notice: Subject to any disclaimer, the term of this patent is extended or adjusted under 35 U.S.C. 154(b) by 572 days.

(21) Appl. No.: 12/183,027

(22) Filed: Jul. 30, 2008

(65) Prior Publication Data

US 2009/0058729 A1 Mar. 5, 2009

(30) Foreign Application Priority Data

Jul. 30, 2007 (KR) ........................ 10-2007-0076408

(51) Int. Cl.
*G01S 5/02* (2010.01)

(52) U.S. Cl. ...................................... 342/420

(58) Field of Classification Search ........... 342/413–420
See application file for complete search history.

(56) References Cited

U.S. PATENT DOCUMENTS

| 5,719,584 | A | 2/1998 | Otto | |
|---|---|---|---|---|
| 5,945,948 | A | 8/1999 | Buford et al. | |
| 6,795,019 | B2 * | 9/2004 | Holt | 342/453 |
| 7,072,669 | B1 | 7/2006 | Duckworth | |
| 2005/0179591 | A1 * | 8/2005 | Bertoni et al. | 342/453 |
| 2008/0224930 | A1 * | 9/2008 | Chizhik et al. | 342/417 |

FOREIGN PATENT DOCUMENTS

| EP | 1513366 A1 | 3/2005 |
|---|---|---|
| JP | 2001-349936 A | 12/2001 |

OTHER PUBLICATIONS

European Search Report dated Nov. 26, 2008 for European Application No. 08013116.2 (7 pages).
Jo, Y.-H., et al., "Accuracy Enhancement for UWB Indoor Positioning Using Ray Tracing," IEEE/ION Position, Location, and Navigation Symposium, pp. 565-568, Apr. 2006.
Wu, S., et al., "NLOS Error Mitigation for UWB Ranging in Dense Multipath Environments," IEEE Wireless Communications and Networking Conference (WCNC 2007), pp. 1567-1572, Mar. 2007.

* cited by examiner

*Primary Examiner* — Thomas Tarcza
*Assistant Examiner* — Nga X Nguyen
(74) *Attorney, Agent, or Firm* — Edwards Angell Palmer & Dodge LLP; Kongsik Kim

(57) ABSTRACT

Techniques, systems and computer readable medium are disclosed for measuring a position of an object device. A position measuring apparatus includes a receiving unit designed to receive a signal transmitted from an object device for position measurement. The position measuring apparatus also includes a position computing unit designed to compute a position of the object device by applying Angle Of Arrival (AOA) and Time Of Arrival (TOA) techniques using the received signal. The position measuring apparatus also includes a medium channel estimating unit designed to estimate a channel of a medium, through which the received signal penetrates on a transmission path, using the received signal. The position measuring apparatus also includes a position correcting unit configured to compute a delay time caused by the received signal penetrating the medium using the estimated medium channel and correcting the position of the object device computed by the position computing unit using the delay time.

13 Claims, 9 Drawing Sheets

MEASURING POSITIONS

CLAIM OF PRIORITY

This application claims priority under 35 USC §119(a) to Korean Patent Application No. 10-2007-0076408, filed on Jul. 30, 2007, in the Korean Intellectual Property Office, the entire contents of which are hereby incorporated by reference.

TECHNICAL FIELD

The present invention relates to measuring a position of a specific object.

BACKGROUND

Development of mobile communications techniques has provided different ways for measuring a position of a specific object in a communication network. For example, GPS (Global Positioning System) technology may be implemented to use a signal from an artificial satellite. GPS technology is dependent of strengths of satellite signals, and requires a GPS receiver installed in an object which position is to be tracked.

SUMMARY

Techniques, apparatus and system are described for position measuring including measuring a position of a specific object with improved accuracy of position recognition in a NLOS (Non-Line-Of-Sight) environment.

In one aspect, a position measuring apparatus according to a first aspect of the present invention includes a receiving unit designed to receive a signal transmitted from an object device for position measurement; a position computing unit designed to compute a position of the object device by applying Angle of Arrival (AOA) and Time of Arrival (TOA) techniques using the received signal; a medium channel estimating unit designed to estimate a channel information of a medium, through which the received signal penetrated on a transmission path, using the received signal; and a position correcting unit designed to compute a delay time caused by the received signal penetrating the medium using the estimated medium channel information and correcting the position of the object device computed by the position computing unit using the delay time.

Implementations can optionally include one or more of the following features. The medium channel estimating unit can include a receiving channel estimating unit designed to estimate a receiving channel using the received signal; and a medium channel computing unit designed to compute a channel of a medium by removing an antenna transfer function and an LOS receiving channel from the receiving channel.

The position measuring apparatus can include a storing unit designed to store information of the antenna transfer function and the LOS receiving channel. The medium channel computing unit can compute the medium channel using information of the antenna transfer function and the LOS receiving channel stored in the storing unit.

The position correcting unit can include a distance shift computing unit designed to compute a thickness of the medium using the estimated medium channel and compute a transmission distance shift of the received signal based on the thickness of the medium; and a position determining unit designed to reflect the transmission distance shift computed by the distance shift computing unit on the position of the object device computed by the position computing unit to determine a final position of the object device.

In addition, the position measuring apparatus can include a medium information storing unit designed to store information of medium channels for each thickness of the medium. The distance shift computing unit can compute a thickness of the medium in the medium information storing unit using the estimated medium channel.

The position measuring apparatus can include an incident angle determining unit configured to scan signals in all directions received from the object device and determine a receiving direction of a signal received first as an incident angle of antenna.

The position computing unit can include a detecting unit designed to detect a time index of an impulse response of a path corresponding to the signal received first. The incident angle determining unit can determine, as an incident angle of antenna, an incident angle of an earliest time index among time indexes for each incident angle outputted from the detecting unit.

In another aspect, a position measuring method includes receiving a signal transmitted from an object device for position measurement; computing a position of the object device by applying Angle of Arrival (AOA) and Time of Arrival (TOA) techniques using the received signal; estimating a channel information of a medium, through which the received signal penetrates on a transmission path, using the received signal; and computing a delay time caused by the received signal penetrating the medium using the estimated medium channel information and correcting the position of the object device using the delay time.

Implementations can optionally include one or more of the following features. Estimating the channel information may include estimating a receiving channel using the received signal; and computing a channel of a medium by removing an antenna transfer function and an LOS receiving channel from the estimated receiving channel.

Determining the position may include computing a thickness of the medium using the estimated medium channel information and computing a transmission distance shift of the received signal based on the thickness of the medium; reflecting the computed transmission distance shift on the computed position of the object device to determine a final position of the object device.

The position measuring method may include scanning signals in all directions received from the object device and determining a receiving direction of a signal received first as an incident angle of antenna.

Determining the incident angle may include rotating an antenna by a predetermined angle; detecting time indexes of impulse responses received first of received signals for each angle; and selecting a minimum time index among the detected time indexes of the impulse responses received first and determining an angle corresponding to the selected minimum time index as an incident angle of antenna.

Yet in another aspect, a position measuring apparatus for measuring a position of an object device for position measurement includes a receiving unit that receives a signal transmitted through a medium from the object device. The apparatus includes a position computing unit in communication with the receiving unit to receive the received signal and to compute a position of the object device based on at least one of an angle of arrival of the received signal and a time of arrival of the received signal at the receiving unit. Also, the apparatus includes a medium channel estimating unit that estimates a component of the received signal attributed to the medium. Further, the apparatus includes a position correcting unit in communication with the medium channel estimating unit that calculates a delay time in the signal received by the receiving unit based on the estimated component of the received signal attributed to the medium, and corrects the computed position of the object device based on the calculated delay time.

Implementations can optionally include one or more of the following features. The medium channel estimating unit can include a receiving channel estimating unit that estimates a receiving channel using the received signal and a medium channel computing unit that computes a channel of the medium that represents the estimated component of the received signal attributed to the medium by removing components attributed to an antenna and a Line Of Sight (LOS) signal from the receiving channel. The apparatus can include a storing unit that stores information of the antenna and the LOS signal. The medium channel computing unit can compute the component of the received signal attributed to the medium using the stored information of the antenna and the LOS signal. The position correcting unit can include a distance shift computing unit that computes a thickness of the medium using the estimated component of the signal attributed to the medium, and computes a transmission distance shift of the received signal based on the computed thickness of the medium. The position correcting unit can also include a position determining unit that determines a final position of the object device by reflecting the computed transmission distance shift on the computed position of the object device. The apparatus can include a medium information storing unit that stores information of medium channels for each thickness of the medium. The distance shift computing unit can compute a thickness of the medium in the medium information storing unit using the estimated component attributed to the medium. The apparatus can include an incident angle determining unit that scans signals in all directions received from the object device, and determines a receiving direction of a signal received first as an incident angle of an antenna associated with the position measuring apparatus.

The techniques and systems as described in this specification may optionally provide one or more of the following advantages. The techniques and system described in this specification can be used in an indoor location. In addition, a separate receiver need not be installed in each object, which can lower implementation costs. Also, a position of a specific object can be provided with improved accuracy of position recognition in a NLOS environment or an indoor area where an LOS signal component is not received.

Further, the techniques and systems can be implemented in an urban area and yet minimize error due to the LOS signal component being reflected or lost. Also, an error in distance measured can be minimized by reducing the propagation signal delay due to lossy media such as buildings. Further, reduced accuracy of position recognition can be minimized by reducing any additional signal propagation delay due to a lossy medium such as a wall, a wooden door or a glass window of a building.

BRIEF DESCRIPTION OF THE DRAWINGS

For illustrative purposes, only a few example embodiments of the present disclosure are described with reference to the accompanying drawings.

DETAILED DESCRIPTION

Figure 1:
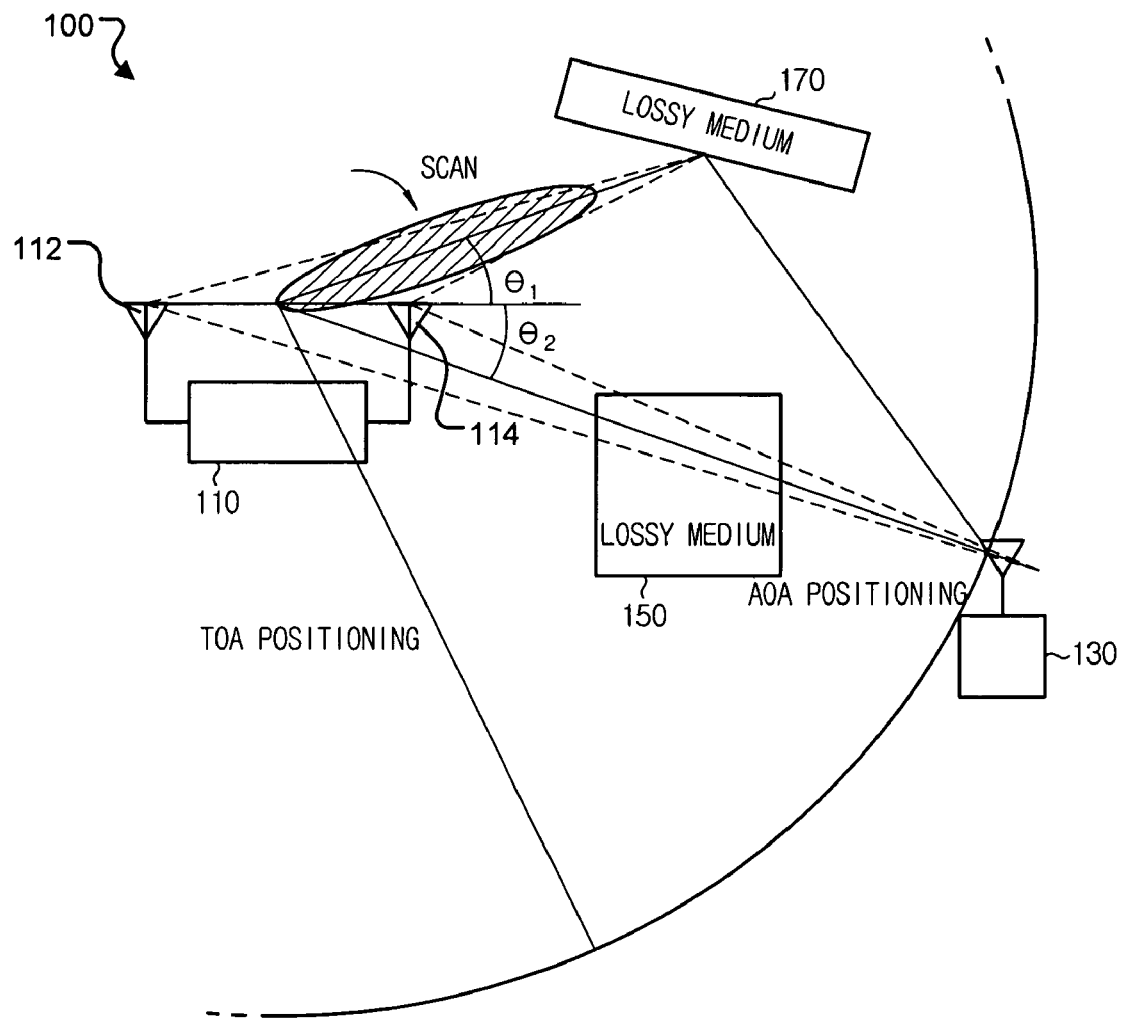
FIG. 1 is a view illustrating an example position measuring system.

Techniques, apparatus and systems are described for measuring a position of a particular object.

A position of an object can be measured using a signal emitted from the object. Angle Of Arrival (AOA) is positioning techniques that measures an angle of arrival of a signal emitted from an object for position measurement to detect a direction of the object and determines a position of the object. Using AOA, a position of an object is measured on the assumption of a LOS (Line-Of-Sight) environment. In an urban area, for example, an LOS signal component is not received or is reflected due to buildings. Thus, such a signal causes a considerably large error.

Time of Arrival (TOA) is a positioning technique that measures a time of arrival between an object for position measurement and a receiver to determine a position of the object. Using TOA, a time of arrival is measured to determine a position of an object. However, delays can occur to a propagation signal due to the presence of lossy media such as buildings, and as a result, an error in distance occurs.

UWB (Ultra WideBand) technology is capable of communication and indoor position recognition with low cost and low power consumption. UWB provides position recognition/tracking functions with precision of several tens of centimeters or less in a relatively narrow area. In UWB, an additional delay occurs to signal propagation due to a lossy medium such as a wall, a wooden door or a glass window of a building, thereby resulting in reduced accuracy of position recognition.

To compensate for the effect of a lossy medium, a position measuring apparatus is described for measuring a position of an object device for position measurement. The position measuring apparatus includes a receiving unit that receives a signal transmitted through a medium from the object device. A position computing unit in communication with the receiving unit can receive the received signal and compute a position of the object device based on an angle of arrival of the received signal and/or a time of arrival at the receiving unit. The received signal has several components including a component attributed to line-of-sight (LOS) signal, a component attributed to a transfer function of the antennas, and a component attributed to the medium. A medium channel estimating unit can be implemented to estimate the component of the received signal attributed to the medium. The components of the received signal attributed to the LOS signal and the transfer function of the antennas can be predetermined and stored for later processing. The component of the received signal attributed to the medium (i.e., medium channel) is unknown, but can be estimated by removing the known components. Also, a position correcting unit can be implemented to calculate a delay time in the signal received by the receiving unit based on the estimated component of the received signal attributed to the medium. In addition, the position correcting unit can correct the computed position of the object device based on the calculated delay time.

FIG. 1 is a view illustrating an example position measuring system 100. As shown in FIG. 1, a position measuring system 100 comprises a position measuring apparatus 110, an object device 130 for position measurement, and lossy media 150 and 170 for reflecting or penetrating a propagation signal between the position measuring apparatus 110 and the object device 130.

The position measuring system 100 of FIG. 1 can be implemented to apply MIMO (Multiple Input Multiple Output) technology using multiple sending and receiving antennas. In the example shown in FIG. 1, two antennas 112 and 114 are embedded in the position measuring apparatus 110. However, more than two antennas may be used. In wireless communications, reliability of a propagation signal is considerably reduced due to fading, attenuation, noise or interference. In particular, a fading phenomenon caused by multipath results in a severe signal distortion by the sum of signals having different phases and sizes received through different paths. Such signal distortion can hinder high-speed communications. The MIMO technology uses multiple sending and receiving antennas to prevent an increase of bandwidth of the position measuring system and allow high-speed communications.

As a comparison, using AOA, a position of an object device 130 is measured with antennas 112 and 114 facing toward a receiving direction of a strongest signal. However, in general, the power of a signal reflected on a medium (e.g., lossy medium 170) is stronger than that of a signal penetrated through a medium (e.g., lossy medium 150). Thus, in NLOS environment, a position measuring apparatus measures an angle of arrival ($\theta_1$) in a receiving direction of a reflected signal to compute a position of the object device 130. Accordingly, in NLOS environment, instead of an actual position of the object device 130, a position of the medium 170 is determined as a position of the object device 130. This can cause a large error in position.

The position measuring apparatus 110 according to the present specification measures an angle of arrival ($\theta_2$). The antennas 112 and 114 of the position measuring apparatus 110 are designed to face toward a propagation direction of a signal received first and not toward a receiving direction of a strongest signal. The position measuring apparatus 110 computes a position of the object device 130. Thus, the position measuring apparatus 110 according to the present specification can increase an accuracy of position measurement than the comparable AOA technique.

When an error occurs during the computation of the angle of arrival ($\theta_2$) in position measurement using AOA, an error also occurs in the position of the object device 130 computed by the position measuring apparatus 110. To avoid such error, the position measuring apparatus 110 according to the present specification computes a position of the object device 130 using AOA with antennas 112 and 114 facing toward a propagation direction of a signal received first, and performs position correction using TOA. That is, the position measuring apparatus 110 according to the present specification computes a distance of the object device 130 using TOA and corrects the position of the object device 130 computed using AOA corresponding to the distance computed using TOA.

The signal received first at the position measuring apparatus 110 penetrates through the lossy medium 150, and thus a propagation delay occurs due to the lossy medium 150. The propagation delay time causes an error in the distance computed using TOA. Therefore, the position measuring apparatus 110 estimates and reflects the propagation delay time, due to the lossy medium 150, to remove a distance shift caused by the propagation delay.

Specifically, the position measuring apparatus 110 memorizes or stores beforehand an antenna transfer function, a receiving channel information in LOS environment and channel information (i.e. medium channel information) according to a thickness of the lossy medium 150. The position measuring apparatus 110 estimates a receiving channel (that is, LOS channel+medium channel+antenna transfer function) from a signal penetrating through the lossy medium 150. The position measuring apparatus 110 removes the antenna transfer function and the LOS channel from the estimated receiving channel to estimate the medium channel. The position measuring apparatus 110 computes a thickness of the lossy medium 150 from the medium channel information memorized beforehand, based on the estimated medium channel. Also, the position measuring apparatus 110 deduces a propagation delay time caused by the medium 150 using the computed thickness of the medium 150 and a dielectric constant of the medium 150. Further, the position measuring apparatus 110 reflects the deduced propagation delay time on the position of the object device 130 computed using TOA to remove a TOA position error caused by the propagation delay.

Figure 2:
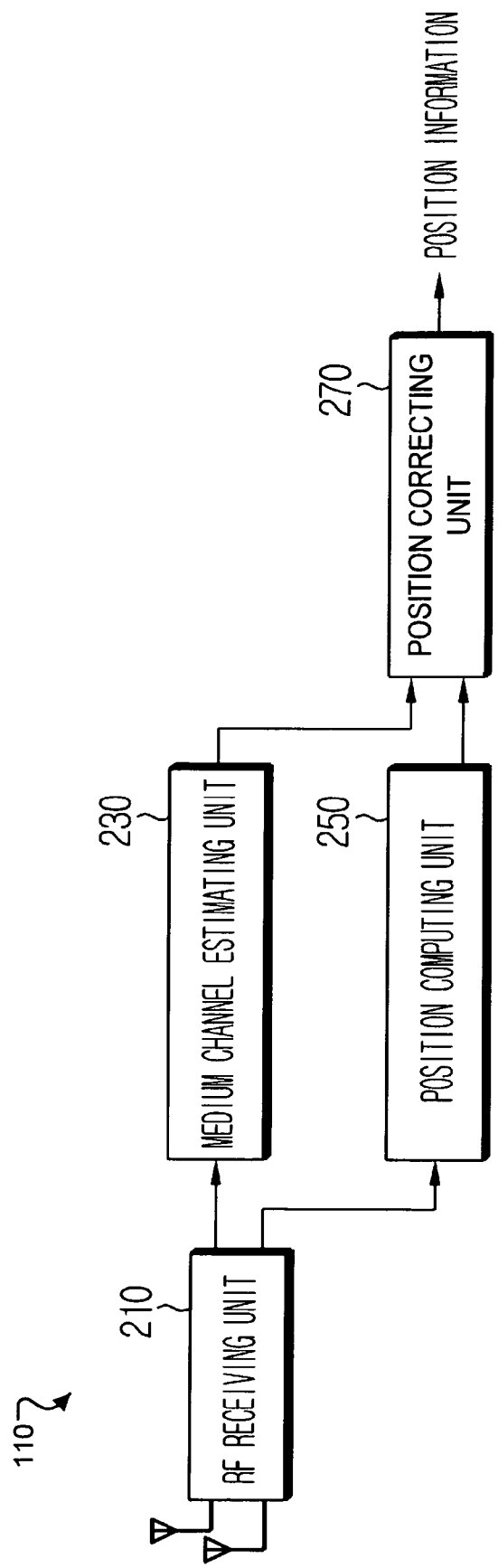
FIG. 2 is a block diagram illustrating an example position measuring apparatus.

FIG. 2 is a block diagram illustrating an example position measuring apparatus 110. As shown in FIG. 2, the position measuring apparatus 110 comprises an RF (Radio Frequency) receiving unit 210, a medium channel estimating unit 230, a position computing unit 250 and a position correcting unit 270. The RF receiving unit 210 receives an RF signal transmitted from the object device 130 using multiple antennas. The RF receiving unit 210 performs a wireless-receive processing, such as frequency down conversion or analog-digital conversion, and outputs the wireless-receive processed signal.

The medium channel estimating unit 230 receives the wireless-receive processed signal from the RF receiving unit 210 and estimates a channel of a medium, through which the received signal penetrates on a transmission channel path. The medium channel estimating unit 230 estimates a receiving channel using a pilot symbol inserted in a signal outputted from the RF receiving unit 210 and a known pilot symbol. In addition, the medium channel estimating unit 230 computes a medium channel of the medium 150, through which the signal transmitted from the object device 130 penetrates, based on the estimated receiving channel, an antenna transfer function and LOS channel information. The receiving channel can be represented as a sum of the antenna transfer function, the LOS channel and the channel of the medium 150, and thus, the channel of the medium 150 is calculated by removing the antenna transfer function and the LOS channel from the receiving channel. The antenna transfer function can be stored beforehand in a memory of the position measuring apparatus 110, and the LOS channel is represented by the following Equation 1 according to Friis transmission equation.

$$\text{LoS Channel } H_{ch,los}(f) = \frac{c}{1\pi fR} \exp\left|-j\frac{2\pi fR}{c}\right| \qquad \text{Equation 1}$$

In Equation 1, f is a band frequency; R is a distance computed by a TOA method; and c is a speed of light. If only magnitude of an LOS channel is considered in Equation 1, an exponential portion becomes 1, and the LOS channel becomes $(c/4\pi fR)^2$.

The position computing unit 250 computes a position of the object device 130 using the signal outputted from the RF receiving unit 210. The position computing unit 250 can compute a position of the object device 130 using TOA and AOA.

The position correcting unit 270 obtains thickness information of the medium 150 using the channel of the medium 150 outputted from the medium channel estimating unit 230. The position correcting unit 270 also computes a propagation delay time using the obtained thickness information of the medium 150 and the dielectric constant of the medium 150. Further, the position correcting unit 270 computes a distance shift according to the computed propagation delay time. The position correcting unit 270 stores a dielectric constant of the medium 150 and the channel information according to a thickness of the medium 150. Here, the medium 150 can represent materials such as glass, wall or wood. In an indoor environment, a lossy medium can include a wall. The position correcting unit 270 stores a dielectric constant of a wall and channel information according to a wall thickness. A signal penetrating through the lossy medium 150 suffers from power loss, and the power loss increases in proportion to thickness of the medium 150, through which the signal penetrates. The position correcting unit 270 stores loss slope information, i.e. channel information corresponding to the thickness of the medium 150.

The position correcting unit 270 obtains, from the stored information, a thickness of the medium 150 having channel information corresponding to the channel of the medium 150 outputted from the medium channel estimating unit 230. That is, the position correcting unit 270 obtains the thickness information of the medium 150, through which the signal transmitted from the object device 130 penetrates. Then, the position correcting unit 270 computes a propagation delay time using the obtained thickness information of the medium 150 and the dielectric constant of the medium 150. Also, the position correcting unit 270 computes a distance shift according to the propagation delay time. That is, the position correcting unit 270 computes a distance shift by multiplying the propagation delay time by a transmission speed.

The position correcting unit 270 corrects the position of the object device 130, computed by the position computing unit 250, using the computed distance shift value caused by the medium 150. Thus, a position error caused by the medium 150 is removed, thereby obtaining correct position information.

Figure 3:
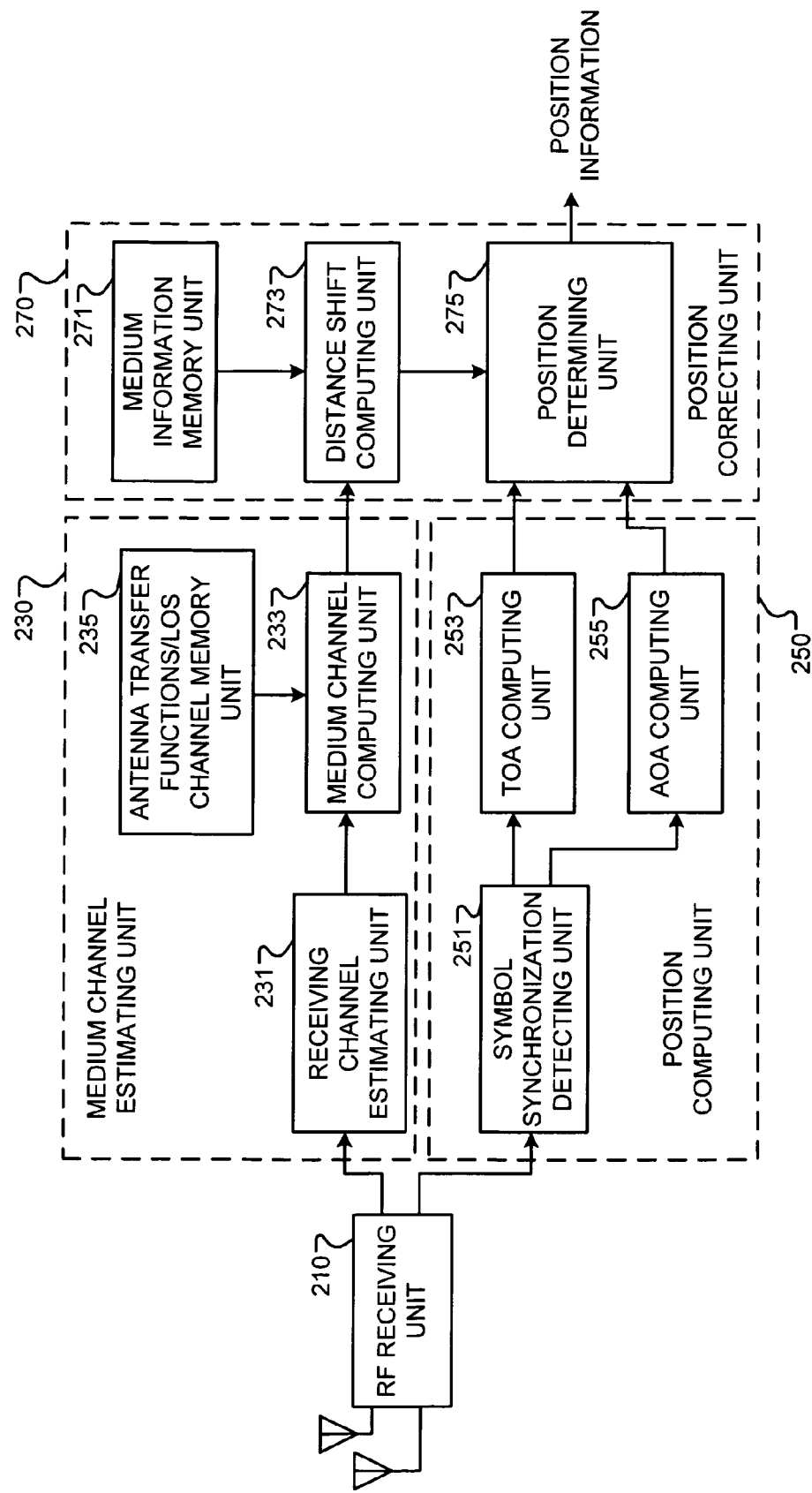
FIG. 3 is a detailed block diagram illustrating the position measuring apparatus of FIG. 2.

FIG. 3 is a detailed block diagram illustrating an example representation of a position measuring apparatus. As shown in FIG. 3, the medium channel estimating unit 230 of the position measuring apparatus 110 includes a receiving channel estimating unit 231, a medium channel computing unit 233 and an antenna transfer function/LOS channel memory unit 235. The position computing unit 250 includes a symbol synchronization detecting unit 251, a TAO computing unit 253 and an AOA computing unit 255. The position correcting unit 270 includes a medium information memory unit 271, a distance shift computing unit 273 and a position determining unit 275.

The receiving channel estimating unit 231 of the medium channel estimating unit 230 receives the wireless receive processed signal from the RF receiving unit 210 and estimates a receiving channel on a transmission path. Specifically, the receiving channel estimating unit 231 estimates a receiving channel using a pilot symbol inserted in the signal outputted from the RF receiving unit 210 and a known pilot symbol, and outputs the estimated receiving channel result to the medium channel computing unit 233. Because the signal loss may be severe, the receiving channel estimating unit 231 repetitively estimates receiving channels from multiple signals and calculates sliding averages of the estimated receiving channels to determine a desired receiving channel.

The medium channel computing unit 233 computes a medium channel of the medium 150, through which the signal transmitted from the object device 130 penetrates, based on the receiving channel outputted from the receiving channel estimating unit 231, an antenna transfer function and an LOS channel stored in the antenna transfer function/LOS channel memory unit 235. Specifically, the receiving channel estimated by the receiving channel estimating unit 231 is the sum of the antenna transfer function, the LOS channel and the channel of the medium 150. The channel of the medium 150 is calculated by removing the antenna transfer function and the LOS channel from the receiving channel estimated by the receiving channel estimating unit 231.

The antenna transfer function/LOS channel memory unit 235 records and stores channel information obtained when the position measuring apparatus 110 is adjacent to the object device 130, i.e. an antenna transfer function. In addition, the antenna transfer function/LOS channel memory unit 235 records and stores channel information for the LOS environment where there is no medium 150 between the position measuring apparatus 110 and the object device 130, i.e. LOS channel.

The symbol synchronization detecting unit 251 of the position computing unit 250 computes a correlation value of the signal outputted from the RF receiving unit 210 and outputs a time index (i.e. a counter) of a point where a slope (i.e. differential value) of the correlation value reduces for the first time. That is, the symbol synchronization detecting unit 251 outputs an index of a maximum impulse response of a path of a signal received first among multipath signals.

The TAO computing unit 253 computes a distance of the object device 130 from the position measuring apparatus 110 using the index outputted from the symbol synchronization detecting unit 251. The AOA computing unit 255 receives angle information of the two antennas (e.g., antennas 112, 114), and computes a position coordinate of the object device 130 using the received angle information of the two antennas.

The distance shift computing unit 273 of the position correcting unit 270 obtains thickness information of the medium 150 from the medium information memory unit 271 using the channel of the medium 150 outputted from the medium channel computing unit 233. The distance shift computing unit 273 computes a propagation delay time using the obtained thickness information of the medium 150 and the dielectric constant of the medium 150. Also, the distance shift computing unit 273 computes a distance shift according to the propagation delay time.

Specifically, the medium information memory unit 271 stores the dielectric constant of the medium 150 and the channel information according to the obtained thickness of the medium 150. Here, the medium 150 can represent materials such as glass, wall or wood. In an indoor environment, a lossy medium can be a wall, and thus the medium information memory unit 271 stores a dielectric constant of a wall and channel information according to the wall thickness. The signal penetrating through the lossy medium 150 suffers from power loss, and the power loss increases in proportion to thickness of the medium 150, through which the signal penetrates.

Figure 6:
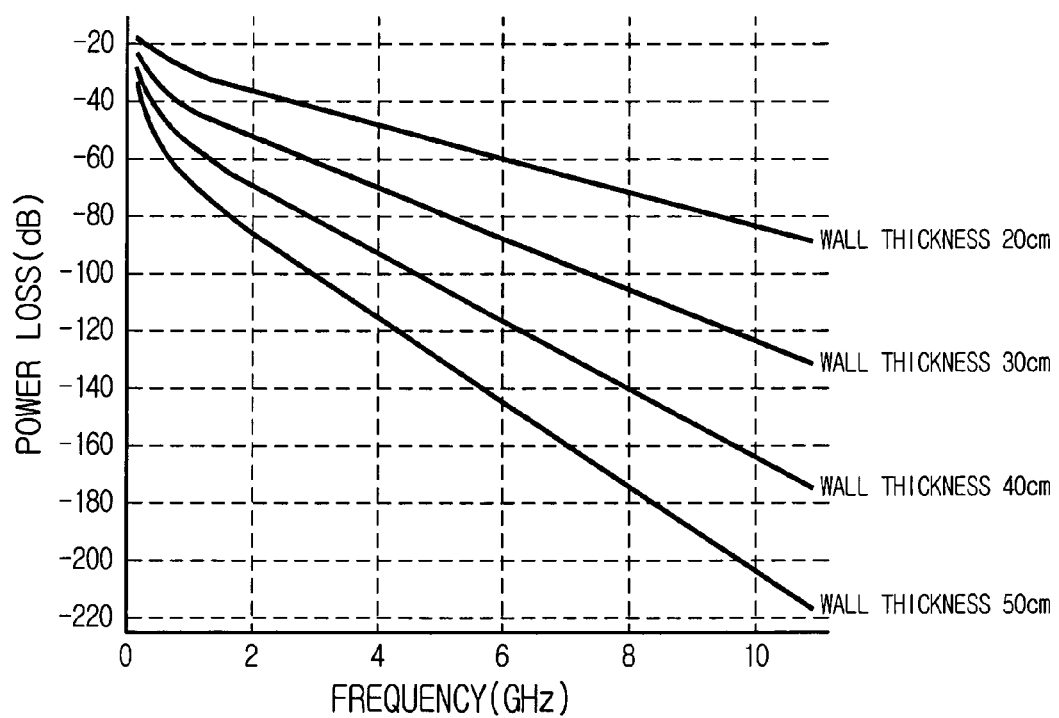
FIG. 6 is a graph illustrating example channel information according to a thickness of a medium stored in a medium information memory unit of a position measuring apparatus.

FIG. 6 is a graph illustrating example channel information according to a thickness of a medium (e.g., medium 150) stored in a memory unit (e.g., medium information memory unit 271). As shown in FIG. 6, as frequency increases in a predetermined thickness of the lossy medium 150, power loss increases. In addition, as the thickness of the medium 150 increases in a predetermined frequency, power loss increases. In other words, as the thickness of the lossy medium 150 increases, a loss slope of the channel of the lossy medium 150 grows steep.

The medium information memory unit 271 stores the loss slope information, i.e. channel information according to the thickness of the medium 150. The distance shift computing unit 273 obtains, from the medium information memory unit 271, a thickness of the medium 150 having channel information corresponding to the channel of the medium 150 outputted from the medium channel computing unit 233. In this way, the distance shift computing unit 273 obtains the thickness information of the medium 150, through which the signal transmitted from the object device 130 penetrates. Then, the distance shift computing unit 273 computes a propagation delay time using the obtained thickness information of the medium 150 and the dielectric constant of the medium 150. Further, the distance shift computing unit 273 computes a distance shift according to the propagation delay time. That is, the distance shift computing unit 273 computes a distance shift by multiplying the propagation delay time by a transmission speed.

The position determining unit 275 computes a position of the object device 130 using the position coordinate of the object device 130 outputted from the AOA computing unit 255, the distance of the object device 130 outputted from the TOA computing unit 253 and the distance shift value due to the medium 150 outputted from the distance shift computing unit 273. The position computation performed by the position determining unit 275 is described further with reference to FIG. 7 as follows.

Figure 7:
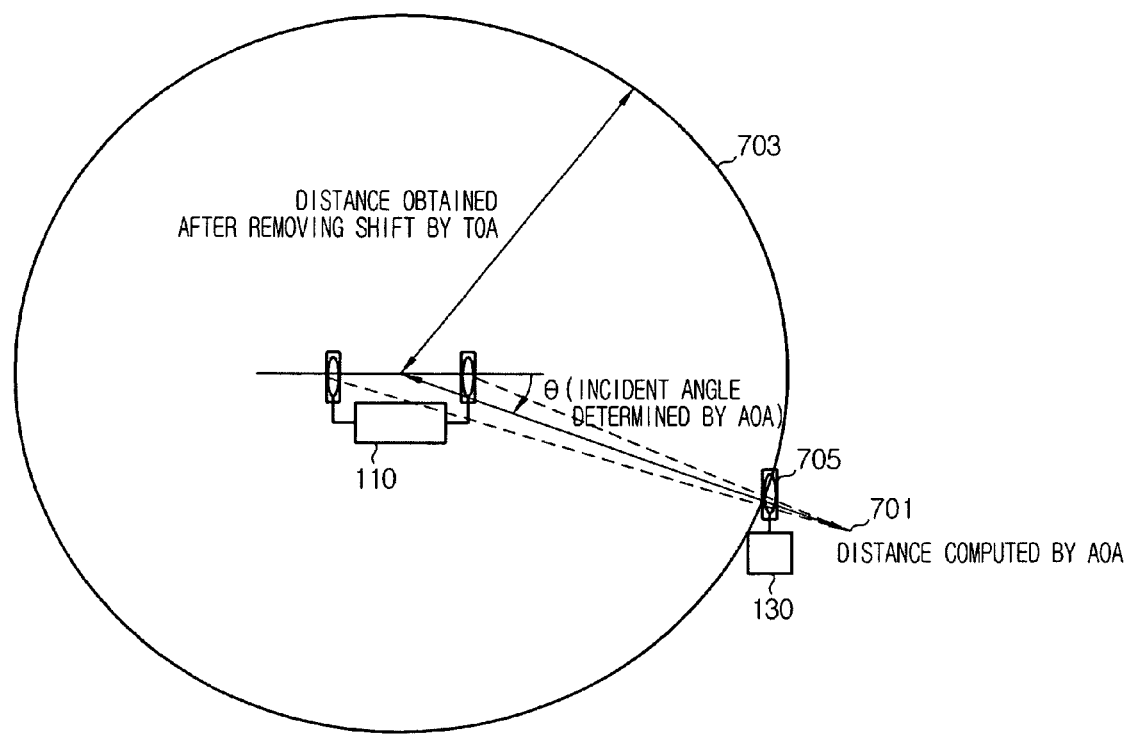
FIG. 7 illustrates an example position determining unit for computing a position of an object device for position measurement in a position determining unit of a position measuring apparatus.

FIG. 7 illustrates an example position determining unit for computing a position of the object device 130. The position determining unit 275 computes a position of the object device 130 using the position coordinate outputted from the AOA computing unit 255. In FIG. 7, a reference numeral 701 represents a position of the object device 130 computed using the position coordinate outputted from the AOA computing unit 255. As shown in FIG. 7, even a slight error in an angle of arrival computed from the signal transmitted from the object device 130 causes a discrepancy between an actual position 705 and the position 701 computed using AOA.

Accordingly, after determining the position of the object device 130 using AOA, the position determining unit 275 performs position correction using TOA. The position determining unit 275 reflects the distance shift information outputted from the distance shift computing unit 273 on the distance information of the object device 130 outputted from the TOA computing unit 253 to correct the position of the object device 130 (Ref. No. 703 of FIG. 7). The position determining unit 275 determines, as a final position of the object device 130, a position spaced away by the corrected distance on a straight line from the position measuring apparatus 110 to the position 701 of the object device 130 computed using AOA Ref. No. 705 represents the final actual position.

Figure 4:
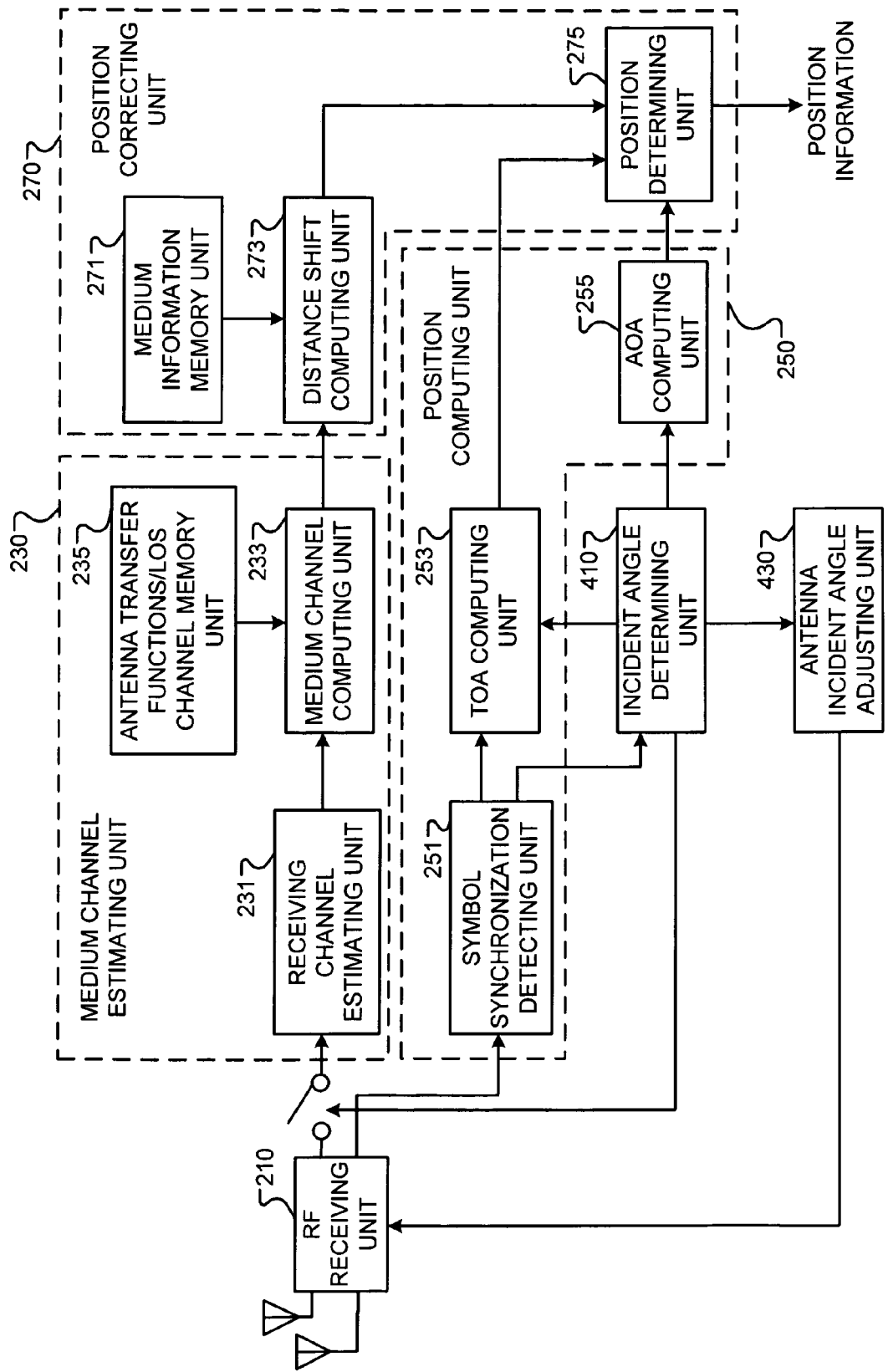
FIG. 4 is a block diagram illustrating an example position measuring apparatus.

FIG. 4 is a block diagram illustrating another example position measuring apparatus. As shown in FIG. 4, the position measuring apparatus 110 according to the present specification further comprises an incident angle determining unit 410 and an antenna incident angle adjusting unit 430. The incident angle determining unit 410 transmits an antenna rotation command to the antenna incident angle adjusting unit 430, and determines a receiving direction of a signal received first among signals transmitted from the object device 130 as an angle of antenna. Specifically, the incident angle determining unit 410 transmits an antenna rotation command to the antenna incident angle adjusting unit 430 to change the angle of antenna. The incident angle determining unit 410 selects a signal received first among signals transmitted from the object device 130 using an index outputted from the symbol synchronization detecting unit 251 according to a change in an angle of antenna, and determines a receiving direction of the selected signal as an incident angle of antenna. The symbol synchronization detecting unit 251 outputs a time index of an impulse response of a path of a signal received first for each antenna angle among paths of signals received at each antenna angle. The incident angle determining unit 410 selects a time index of an impulse response of a path corresponding to a signal that was received first most among the time indexes of the impulse responses of the paths corresponding to the signals received first collected for each antenna angle. The incident angle determining unit 410 determines an angle of antenna corresponding to the selected impulse response, associated with the selected time index, as an incident angle.

Figure 5:
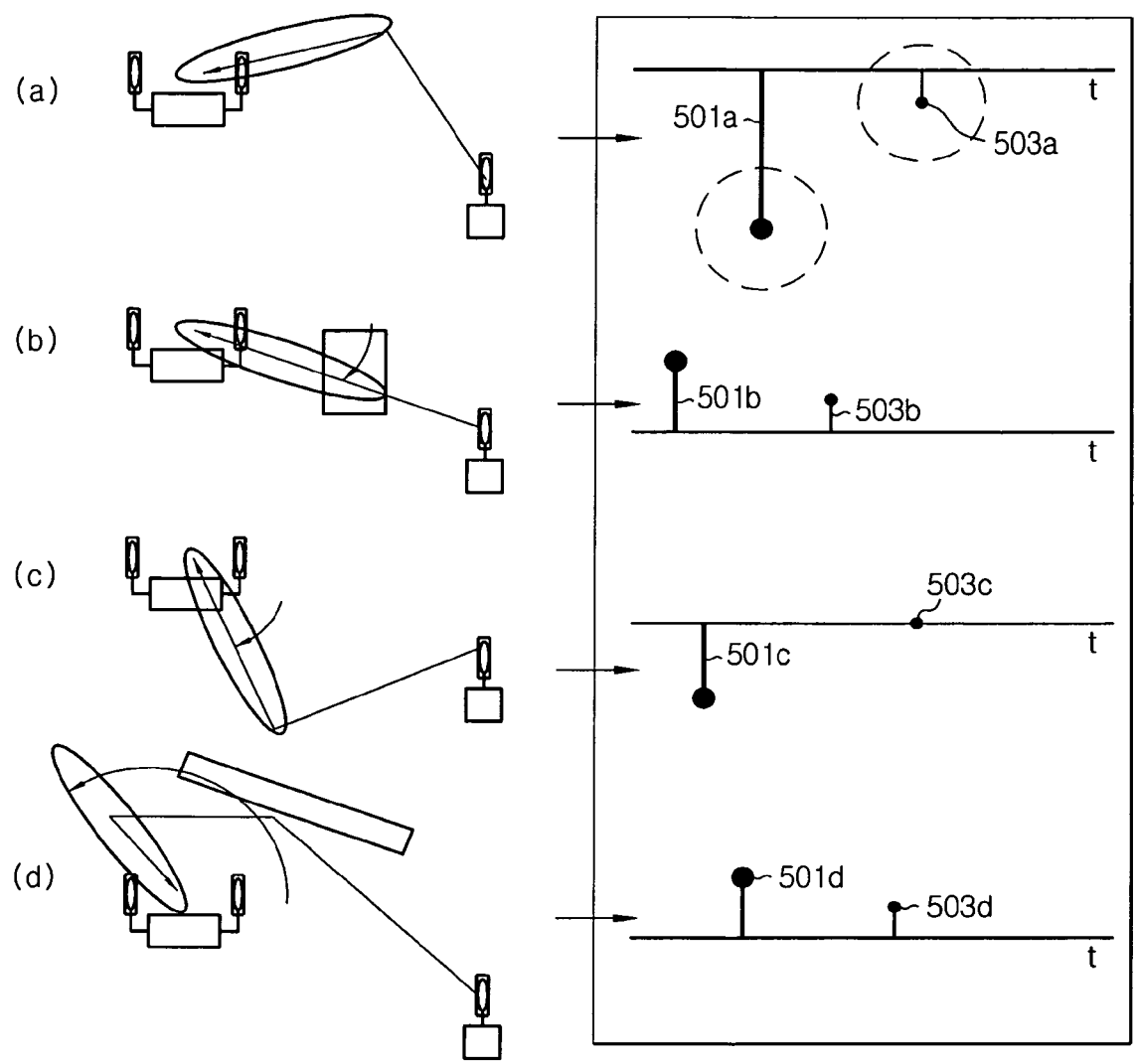
FIG. 5 is a view illustrating examples of an impulse response according to a transmission path of a signal received from an object device for position measurement.

The operation of the symbol synchronization detecting unit 251 and the incident angle determining unit 410 is described further with reference to FIG. 5. FIG. 5 illustrates examples of an impulse response according to a transmission path of a signal received from the object device 130. When an incident angle of antenna is changed by a rotation of antenna angle of the position measuring apparatus 110, the symbol synchronization detecting unit 251 detects an impulse response of a path of a signal received first for each incident angle according to the change in an angle of antenna.

Figure 9:
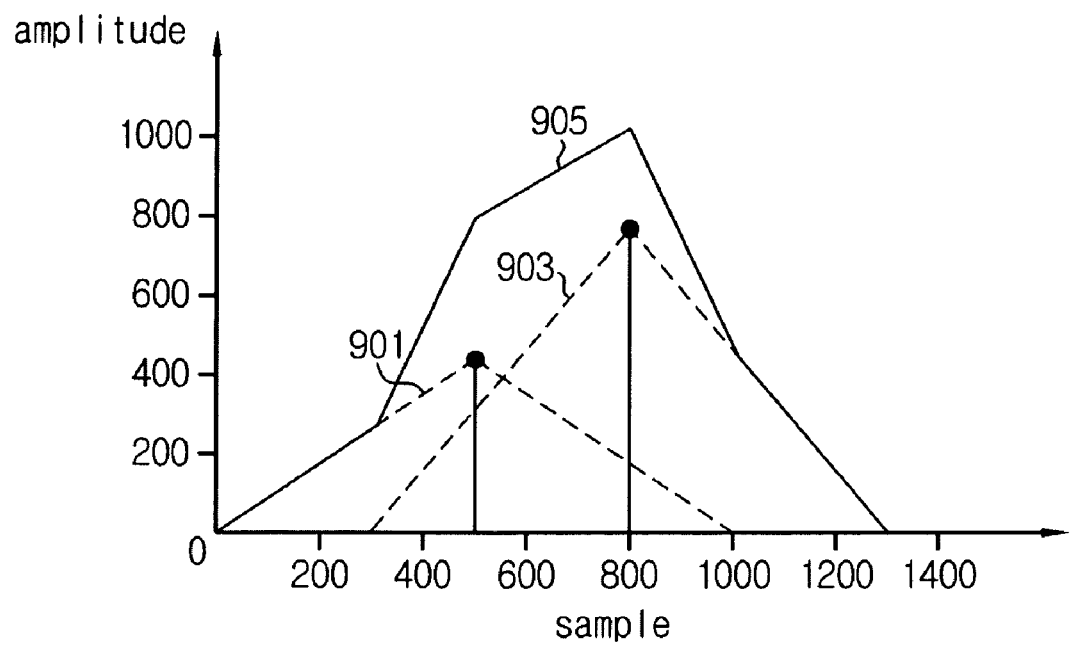
FIG. 9 is a view illustrating an example process for detecting an impulse response of a path of a signal received first at an incident angle.
Figure 9:
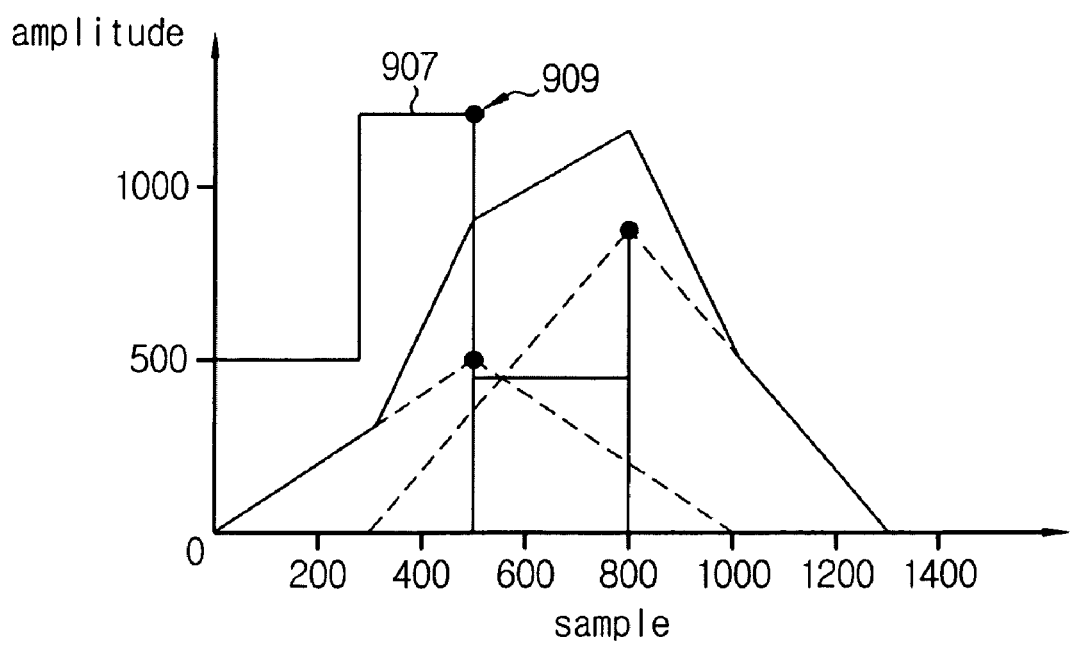

FIG. 9 illustrates examples of detecting an impulse response of a path of a signal received first at an incident angle. FIG. 9(a) is a graph illustrating an example impulse response of an incident angle. As shown in FIG. 9(a), when a multipath signal is received at an incident angle, an impulse response 905 of an incident angle appears as overlapped multipath impulse responses 901 and 903. Thus, to detect an impulse response 901 of a path of a signal received first in the impulse response 905, a slope of the impulse response 905 is used. A reference numeral 907 of FIG. 9(b) is a slope of the impulse response 905. The impulse response 901 of a path of a signal received first in the impulse response 905 is represented by a point 909 where a slope reduces for the first time. The symbol synchronization detecting unit 251 performs FIR (Finite Impulse Response) filtering; differentiates between samples to obtain a slope; and detects a point where the slope reduces for the first time as an impulse response of a path of a signal received first.

Referring back to FIG. 5, the symbol synchronization detecting unit 251 obtains impulse responses for each incident angle, and selects impulse responses 501a, 501b, 501c and 501d of signals received first for each incident angle by using the process described with respect to FIG. 9. The incident angle determining unit 410 selects an impulse response

501b having a minimum time index among the impulse responses 501a, 501b, 501c and 501d of signals received first for each incident angle detected by the symbol synchronization detecting unit 251. Also, the incident angle determining unit 410 determines an angle of antenna, where the impulse response 501b is detected, as an incident angle.

The antenna incident angle adjusting unit 430 rotates the antennas (e.g., antennas 112, 114) in a clockwise or counter-clockwise direction by a preset angle (for example, 1°) according to the antenna rotation command outputted from the incident angle determining unit 410. The antenna incident angle adjusting unit 430 rotates the antennas in a specific direction according to the antenna rotation command of the incident angle determining unit 410 and fixes the antennas at that position.

After the direction of the antennas is determined, the TOA computing unit 253 receives an antenna direction determination completion signal from the incident angle determining unit 410. After receiving the antenna direction determination completion signal, the TOA computing unit 253 computes a distance of the object device 130 using the index outputted from the symbol synchronization detecting unit 251.

After the direction of the antennas is determined by the incident angle determining unit 410, the AOA computing unit 255 receives angle information of the two antennas from the incident angle determining unit 410 and computes a position coordinate of the object device 130 using the received angle information of the two antennas.

Figure 8:
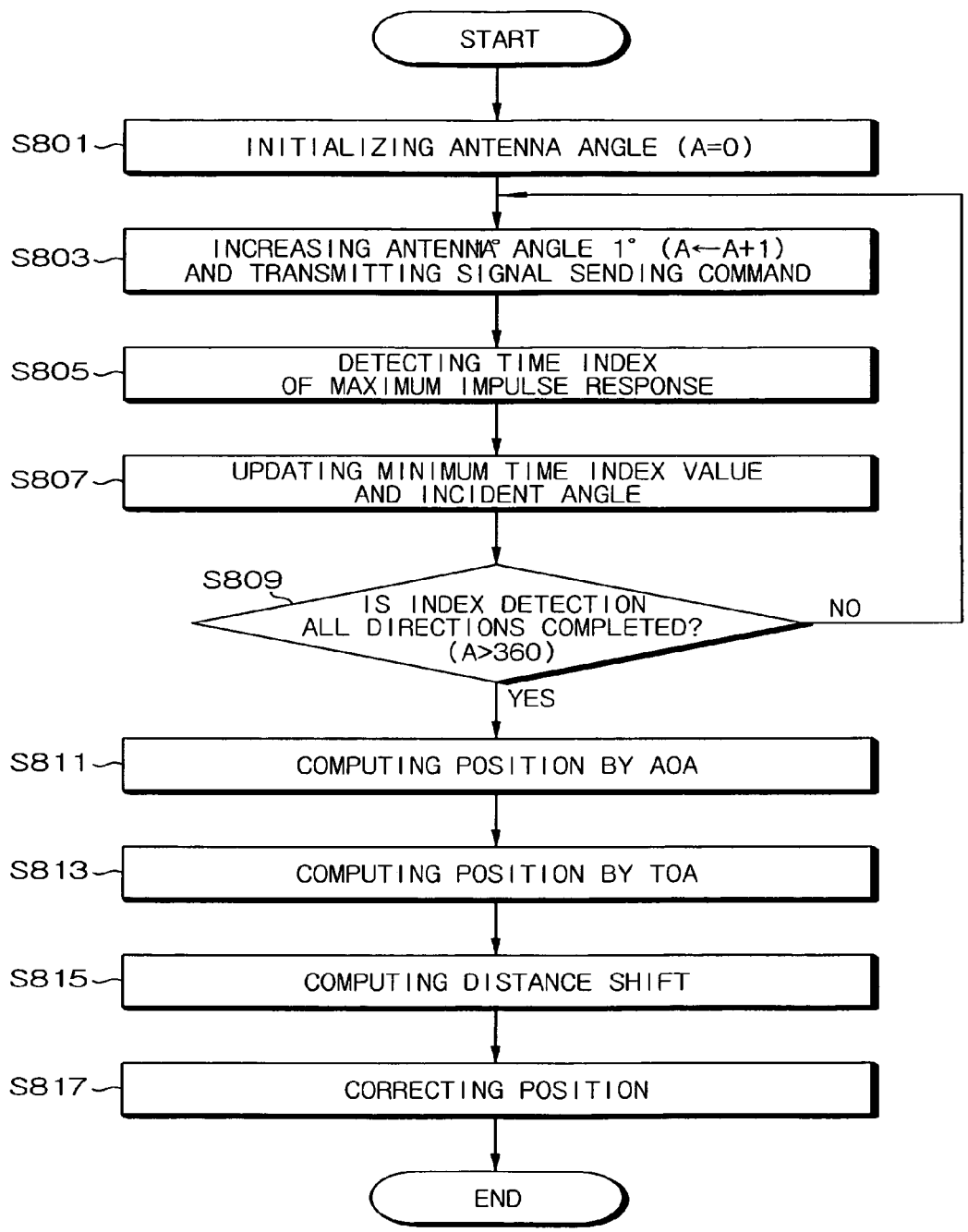
FIG. 8 is a flow chart illustrating an example position measuring process performed in a position measuring.

FIG. 8 is a flow chart illustrating an example position measuring process. As shown in FIG. 8, when a position measurement command is inputted from a user and the object device 130 is specified, the position measuring apparatus 110 initializes an angle of antenna to 0° (S801).

The position measuring apparatus 110 increases the angle of antenna (e.g., by 1°), and transmits a signal sending command to the object device 130 (S803). When the signal sending command is transmitted from the position measuring apparatus 110 to the object device 130, the object device 130 transmits a signal for position measurement. The signal transmitted from the object device 130 is reflected on the medium 170 or penetrated through the medium 150 and is received at the antennas of the position measuring apparatus 110.

The position measuring apparatus 110 detects a time index of an impulse response of a path of a signal received first among multipath signals received at a current antenna angle (S805). The position measuring apparatus 110 sets the detected time index of the impulse response as a minimum time index, and stores the minimum time index together with an incident angle (S807).

The position measuring apparatus 110 determines whether 360° rotation is completed (S809). When detected that 360° rotation is not completed, the position measuring apparatus 110 increases the angle of antenna 1° and transmits a signal sending command to the object device 130 (S803). The position measuring apparatus 110 detects a time index of an impulse response of a path of a signal received first among multipath signals received after the 1° increase of the angle of antenna (S805). The position measuring apparatus 110 compares the detected time index with a pre-stored minimum time index to update the minimum time index and the incident angle (S807). That is, the position measuring apparatus 110 compares the time index of the impulse response detected at a current antenna angle with the pre-stored minimum time index stored. When the currently detected time index of the impulse response is smaller than the pre-stored minimum time index, the position measuring apparatus updates the pre-stored minimum time index value with the currently detected time index value of the impulse response and updates the incident angle accordingly. When index detection of all directions is completed, the position measuring apparatus 110 stores a time index value and incident angle information of a signal received first.

After scanning of all directions is completed, the position measuring apparatus 110 sets an angle of antenna by an incident angle corresponding to the minimum time index stored/updated at S807 and computes a primary position of the object device 130 using AOA (S811). That is, the position measuring apparatus 110 computes a position of the object device 130 using AOA for a signal received first.

Subsequently, the position measuring apparatus 110 computes a secondary position of the object device 130 using TOA (S813). That is, a position measuring apparatus 110 determines, as a position of the object device 130, a position spaced away from the position measuring apparatus 110 by the distance computed using TOA on a straight line from the position measuring apparatus 110 to the primary position of the object device 130 computed using AOA.

The position measuring apparatus 110 estimates a channel of the medium 150 using the received signal and computes a propagation delay time caused by the medium 150 to compute a distance shift (S815). Specifically, the medium channel computing unit 233 of the position measuring apparatus 110 estimates a channel of the medium 150, through which the signal transmitted from the object device 130 penetrated, based on a receiving channel outputted from the receiving channel estimating unit 231, an antenna transfer function and an LOS channel stored in the antenna transfer function/LOS channel memory unit 235. The receiving channel estimated by the receiving channel estimating unit 231 is the sum of the antenna transfer function, the LOS channel and the channel of the medium 150. Thus, the channel of the medium 150 is calculated when the antenna transfer function and the LOS channel are removed from the receiving channel estimated by the receiving channel estimating unit 231. The distance shift computing unit 273 of the position measuring apparatus 110 obtains thickness information of the medium 150 from the medium information memory unit 271 using the channel of the medium 150 outputted from the medium channel computing unit 233. The distance shift computing unit 273 computes a propagation delay time using the obtained thickness information of the medium 150 and a dielectric constant of the medium 150, and computes a distance shift according to the propagation delay time.

After the distance shift is computed, the position measuring apparatus 110 corrects the position of the object device 130 computed at S813 (S817). When the position of the object device 130 computed at S813 is farther than an actual position, the position of the object device 130 is moved toward the position measuring apparatus 110 by the distance shift.

According to the above-mentioned process, the position measuring apparatus 110 can delicately measure a position of the object device 130.

In some implementations, the techniques and systems described in the present specification may be used in UWB (Ultra WideBand) communication system. UWB technology does not intrude on a conventional broad frequency band, but sends and receives data with considerably low power consumption. Thus, using UWB, interference to an existing frequency channel can be avoided and allow high-speed data transmission in a short distance. In particular, UWB technology uses a pulse signal of excellent time domain resolution and is applicable to high-precision indoor position recognition. Thus, when UWB technology is applied with the techniques and systems described in the present specification, more accurate position recognition can be realized.

In some implementations, OFDM (Orthogonal Frequency Division Multiplexing) technology is used in the UWB band, thereby reducing the likelihood of error in position recognition. The OFDM technology divides the band into sub-bands of 528 MHz and hops over the available bandwidth by FHSS (Frequency-Hopping-Spread-Spectrum), so that all UWB bandwidth can be effectively utilized.

The position measuring techniques and systems according to the present specification may be incorporated as a computer readable code in a computer readable medium. The computer readable medium includes all kinds of storage devices for storing data readable by a computer system. For example, the computer readable medium is CD-ROM (Compact Disc Read Only Memory), RAM (Random Access Memory), ROM (Read Only Memory), a floppy disc, a hard disc or a magneto-optical disc.

The present specification reflects an element that causes delay to a propagation signal to reduce precision of position recognition, for example a wall, a wooden door or a glass window, on position recognition to improve accuracy of position recognition. In particular, the present invention can improve precision of position recognition in UWB (3.1~10.2 GHz) using broadband and 802.11n (2.4 GHz, 5 GHz) communication system.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments.

Only a few implementations and examples are described and other implementations, enhancements and variations can be made based on what is described and illustrated in this application.

What is claimed is:

1. A position measuring apparatus for measuring a position of an object device for position measurement, the apparatus comprising:
    a receiving unit that receives a signal transmitted from the object device;
    a position computing unit that computes a position of the bject device by applying Angle Of Arrival (AOA) and Time Of Arrival (TOA) techniques using the received signal;
    a medium channel estimating unit that estimates a channel of a medium that the received signal penetrates on a transmission path, using the received signal;
    a position correcting unit that calculates a delay time caused by the received signal penetrating through the medium using the estimated medium channel, and corrects the computed position of the object device using the calculated delay time; and
    an incident angle determining unit that scans signals in all directions received from the object device, and determine a receiving direction of a signal received first as an incident angle of an antenna associated with the position measuring apparatus,
    wherein the position computing unit includes;
    a detecting unit that detects a time index of an impulse response of a path corresponding to the signal received first,
    wherein the incident angle determining unit determines, as an incident angle of the antenna, an incident angle of an earliest time index among time indexes for each incident angle outputted from the detecting unit.

2. The position measuring apparatus according to claim 1, wherein the medium channel estimating unit comprises:
    a storing unit that stores an antenna transfer function and a Line Of Sight (LOS) receiving channel;
    a receiving channel estimating unit that estimates a receiving channel using the received signal; and
    a medium channel computing unit that computes a channel of a medium by removing the antenna transfer function and the Line Of Sight (LOS) receiving channel from the receiving channel.

3. The position measuring apparatus according to claim 1, wherein the position correcting unit comprises:
    a distance shift computing unit that computes a thickness of the medium using the estimated medium channel, and computes a transmission distance shift of the received signal based on the computed thickness of the medium; and
    a position determining unit that determines a final position of the object device by reflecting the computed transmission distance shift on the computed position of the object device.

4. The position measuring apparatus according to claim 3, further comprising:
    a medium information storing unit that stores information of medium channels for each thickness of the medium, wherein the distance shift computing unit computes a thickness of the medium in the medium information storing unit using the estimated medium channel.

5. The position measuring apparatus according to claim 1, further comprising:
    an incident angle adjusting unit that adjusts the incident angle of the antenna based on a command of the incident angle determining unit.

6. A position measuring method for measuring a position of an object device for position measurement, the method comprising:
    receiving a signal transmitted from the object device;
    computing a position of the object device by applying Angle of Arrival (AOA) and Time of Arrival (TOA) techniques using the received signal;
    estimating a channel information of a medium, through which the received signal penetrates on a transmission path;
    computing a delay time caused by the received signal penetrating through the medium using the estimated medium channel information and correcting the position of the object device using the delay time; and determining an incident angle by scanning signals in all directions received from the object device and determining a receiving direction of a signal received first as an incident angle of antenna, wherein determining the incident angle comprises:

rotating an antenna by a predetermined angle;

detecting time indexes of impulse responses of paths corresponding to signals received first among the received signals for each angle; and selecting a minimum time index among the detected time indexes of the impulse responses and determining an angle corresponding to the selected minimum time index as an incident angle of antenna.

7. The position measuring method according to claim 6, wherein estimating the channel information of the medium comprises:

storing an antenna transfer function and a Line Of Sight (LOS) receiving channel;

estimating a receiving channel using the received signal; and computing a channel of the medium by removing the antenna transfer function and the LOS receiving channel from the estimated receiving channel.

8. The position measuring method according to claim 6, wherein computing a delay time and correcting the position of the object device using the delay time comprises:

computing a thickness of the medium using the estimated medium channel information and computing a transmission distance shift of the received signal based on the computed thickness of the medium; and determining a final position of the object device by reflecting the computed transmission distance shift on the computed position of the object device.

9. A position measuring apparatus comprising:

a receiving unit that receives a signal transmitted through a medium from an object device;

position computing unit in communication with the receiving unit to receive the received signal and to compute a position of the object device based on at least one of the angle of arrival of the received signal and a time of arrival of the received signal at the receiving unit;

a medium channel estimating unit that estimates a component of the received signal attributed to the medium;

a position correcting unit in communication with the medium channel estimating unit that calculates a delay time in the received signal at the receiving unit based on the estimated component of the received signal attributed to the medium, and corrects the computed position of the object device based on the calculated delay time; and an incident angle determining unit that scans signals in all directions received from the object device, and determining a receiving direction of a signal received first as an incident angle of an antenna associated with the position measuring apparatus, wherein the position computing unit comprises:

a detecting unit that detects a time index of an impulse response of a path corresponding to the signal received first, and an incident angle determining unit that scans signals in all directions received from the object device, and determines a receiving direction of a signal received first as an incident angle of an antenna associated with the position measuring apparatus.

10. The position measuring apparatus according to claim 9, wherein the medium channel estimating unit comprises:

a storing unit that stores an antenna and a Line Of Sight (LOS) signal;

a receiving channel estimating unit that estimates a receiving channel using the received signal; and a medium channel computing unit that computes a channel of the medium that represents the estimated component of the received signal attributed to the medium by removing components attributed to the antenna and the Line Of Sight (LOS) signal from the receiving channel.

11. The position measuring apparatus according to claim 9, wherein the position correcting unit comprises:

a distance shift computing unit that computes a thickness of the medium using the estimated component of the signal attributed to the medium, and computes a transmission distance shift of the received signal based on the computed thickness of the medium; and a position determining unit that determines a final position of the object device by reflecting the computed transmission distance shift on the computed position of the object device.

12. The position measuring apparatus according to claim 11, further comprising:

a medium information storing unit that stores information of medium channels for each thickness of the medium, wherein the distance shift computing unit computes a thickness of the medium in the medium information storing unit using the estimated component attributed to the medium.

13. A non-transitory computer readable medium embodying computer readable instructions operable to cause a data processing apparatus to perform operations comprising:

receiving a signal transmitted from an object device for position measurement;

computing a position of the object device by applying Angle of Arrival (AOA) and Time of Arrival (TOA) techniques using the received signal;

estimating a channel information of a medium, through which the received signal penetrates on a transmission path;

computing a delay time caused by the received signal penetrating the medium using the estimated medium channel information, and correcting the position of the object device using the delay time; and determining an incident angle by scanning signals in all directions received from the object device and determining a receiving direction of a signal received first as an incident angle of antenna, wherein determining the incident angle comprises:

rotating an antenna by a predetermined angle, detecting time indexes of impulse responses of paths corresponding to signals received first among the received signals for each angle, and selecting a minimum time index among the detected time indexes of the impulse responses and determining an angle corresponding to the selected minimum time index as an incident angle of antenna.

* * * * *